US006230960B1

(12) United States Patent
Deschamps

(10) Patent No.: US 6,230,960 B1
(45) Date of Patent: May 15, 2001

(54) CENTRIFUGE TILE

(75) Inventor: John Alexander Deschamps, Somerset (GB)

(73) Assignee: Tiletech Limited (GB)

( * ) Notice: Subject to any disclaimer, the term of this patent is extended or adjusted under 35 U.S.C. 154(b) by 0 days.

(21) Appl. No.: 09/433,192

(22) Filed: Oct. 25, 1999

(30) Foreign Application Priority Data

Oct. 26, 1998 (GB) ........................ 9823345

(51) Int. Cl.$^7$ ........................ B23K 3/00; B23K 5/22

(52) U.S. Cl. ........................ 228/175; 228/212

(58) Field of Search ........................ 228/175, 212, 228/213; 416/219 R; 219/230, 221; 269/164, 152

(56) References Cited

U.S. PATENT DOCUMENTS

| | | | |
|---|---|---|---|
| 3,764,062 | | 10/1973 | Brautigam . |
| 4,006,855 | | 2/1977 | Merzenich . |
| 4,785,769 | * | 11/1988 | Black . |
| 4,821,478 | * | 4/1989 | Cremer et al. . |

FOREIGN PATENT DOCUMENTS

| | | |
|---|---|---|
| WO8102853 | 10/1981 | (WO) . |

OTHER PUBLICATIONS

Patents Act 1977 Search Report under Section 17 (Search Report relating to a corresponding British patent application).

* cited by examiner

*Primary Examiner*—Clifford C. Shaw
*Assistant Examiner*—Jonathan Johnson
(74) *Attorney, Agent, or Firm*—Trexler, Bushnell, Giangiorgi, Blackstone & Marr, Ltd.

(57) ABSTRACT

A method of installing tiles via interposed tile carriers on a scroll of a centrifuge comprises mounting each tile carrier (11) prior to a welding step in the required position on a centrifuge flight by means of an individual tile clamp (32), with mechanical inter-engagement between each carrier (11) and its clamp (32), thus positioning each carrier (11) in the same position relative to its clamp (32) on each application, the tile clamps (32) being of a set width, so that when mounted side by side they pitch the carriers (11) so that when the tiles (10) are inserted there are no gaps between the tiles, thus giving a smooth surface without having to dress the tiles. Mounting is followed by welding the carriers (11), whilst held in position by the tile clamps to the centrifuge flight. The tile clamps; are then removed and once the tile carriers have cooled down to ambient temperature the tiles (10) are inserted and secured to their respective carriers (11). The invention also includes a method of inserting a dovetail ribbed tile (10) into a dovetail grooved carrier (11), and also a certrifuge flight (31) or scroll incorporating such tiles and carriers, and also a centrifuge incorporating such a scroll.

6 Claims, 5 Drawing Sheets

CENTRIFUGE TILE

FIELD OF THE INVENTION

This invention relates to a tile eg of tungsten carbide, for installation with a plurality of similar tiles, in or on a component of a centrifuge, such as the scroll of a centrifuge, in locations of predicted high wear.

BACKGROUND OF THE INVENTION

It is known to install such tiles by the steps by 1) preparing each tile prior to a s sembly, by marking the face with a temperature sensitive paint or crayon eg "Tempil Stick", which will indicate if the maximum allowable temperature of 120° C. is exceeded during a welding stage;
2) preheating the tile to 50° C.;
3) inserting a 0.5 mm shim between the tile being fitted and the adjacent tile and secure the tile correctly and firmly into place using a 'G' type clamp and removing the shim;
4) welding tile on to the flight of a centrifuge scroll etc, using short stringer beads; and
5) before removal of the 'G' clamp, visually checking all welds and repairing cracks which may have formed as a result of cooling.

Furthermore, any tile assembly that is shown to have been heated to a temperature in excess of 120° C. during welding must be removed and replaced by a new tile, as the epoxy bond or a brazing interface of the overheated tile is likely to have been impaired.

Furthermore, considering tiles applied to the flights of a centrifuge scroll, the existing prebonded tile and carrier combination which comes in one size, has to be ground to fit the diameter variations on the tapered portion of the flights, so as to give a smooth and continuous surface.

OBJECT OF THE INVENTION

A basic object of the invention is the provision of an improved method of tile installation eg on a scroll of a centrifuge, and a scroll and a centrifuge incorporating such tiles.

SUMMARY OF A FIRST ASPECT OF THE INVENTION

According to a first aspect of the invention there is provided a method of installing tiles via interposed tile carriers on a scroll of a centrifuge comprising (i) mounting each tile carrier prior to a welding step in the required position on a centrifuge flight by means of an individual tile clamp, with mechanical inter-engagement between each tile carrier and its clamp, thus positioning each tile carrier in the same position relative to its clamp on each application, the tile clamps being of a set width, so that when mounted side by side they pitch the tile carriers so that when the tiles are inserted there are no gaps between the tiles, thus giving a smooth surface without having to dress the tiles;

(ii) welding tile carriers, whilst held in position by the tile clamps (from single to multiple batches) to the centrifuge flight; removing the tile clamps; and (iii) once the tile carriers have cooled down to ambient temperature; inserting the tiles and securing the tiles to their respective tile carriers.

The mechanical inter-engagement between each tile carrier and its clamp may conveniently be a male/female inter-engagement such as a slot and rib, but preferably is an index pin on the clamp which aligns with and engages a hole in the tile carrier.

Although the securing of the tiles to their respective carriers could be effected at a brazed interface, preferably an epoxy adhesive is employed.

SUMMARY OF A SECOND ASPECT OF THE INVENTION

According to a second aspect of the invention, of independent significance, there is provided a method of inserting a tile having a dovetail rib in a carrier having a dovetail groove, comprising:

(i) arranging the rib and groove tolerances such that firstly a lower edge of the tile is inserted into the lower dovetail groove; secondly the tile is rotated to bring its upper dovetail rib within the dovetail groove, and thirdly, the tile is retracted so that angled surfaces of the dovetail rib seat on the angled surfaces of the dovetail groove, and (ii) securing the tile in position, preferably with an injected epoxy resin.

Thus, in accordance with this second aspect, each tile is inserted frontally/radially into its carrier, in contrast to prior art proposals (c.f. FIG. 10 of WO 81/02853) where lateral insertion has been employed. It follows that the tiles and carriers need to be produced to close tolerances to make frontall insertion possible, by engaging a lower face of each tile on a support surface of the groove of its carrier and rotating the tile towards the carrier.

SUMMARY OF A THIRD ASPECT OF THE INVENTION

According to a third aspect there is provided a centrifuge scroll incorporating tile carriers and tiles installed in accordance with the first or second aspects.

SUMMARY OF A FOURTH ASPECT OF THE INVENTION

According to a fourth aspect, there is provided a centrifuge incorporating a scroll in accordance with the third aspect.

BRIEF DESCRIPTION OF THE DRAWINGS

Various aspects of the invention will now be described, by way of example, with reference to the enclosed drawings, in which.

DETAILED DESCRIPTION OF THE DRAWINGS

Figure 1A:
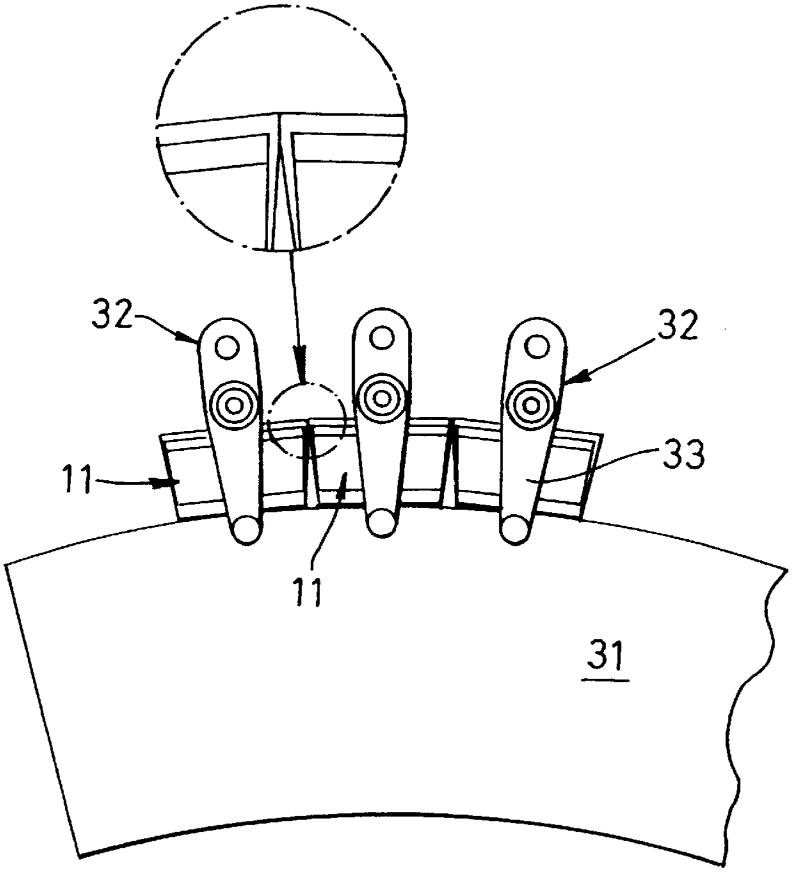
FIG. 1A shows how, in accordance with part (i) of the first aspect, carriers are clamp-mounted, side by side along the edge of a flight or scroll of a centrifuge, with a 3:1 enlargement of an abutment.
Figure 1B:
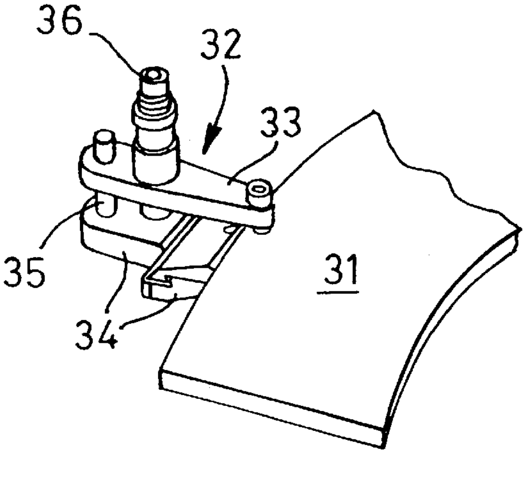
FIGS. 1B and 1C are respectively topside and underside perspective views of a clamp and one carrier of FIG. 1A, with the flight omitted.
Figure 1C:
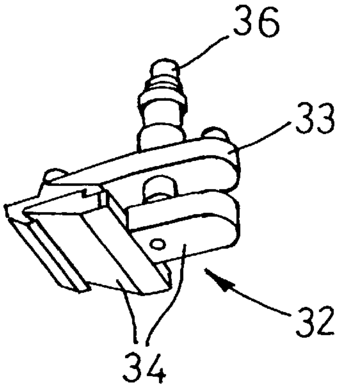
Figure 1E:
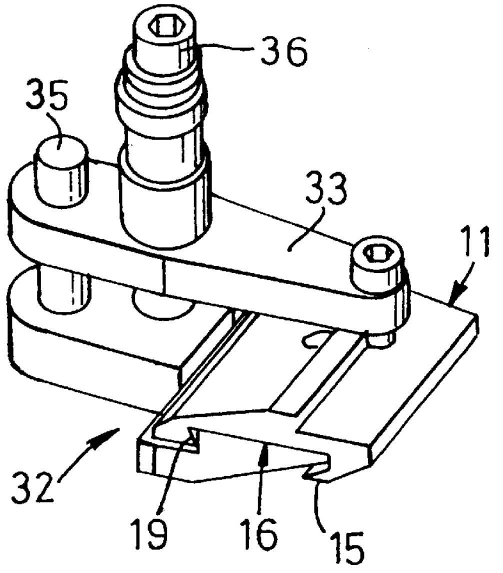
FIGS. 1D and 1E show, to a larger scale, the clamp and tile of FIG. 1B, with the flight omitted, and with FIG. 1D being an exploded perspective view, and FIG. 1E being an assembled perspective view.
Figure 1D:
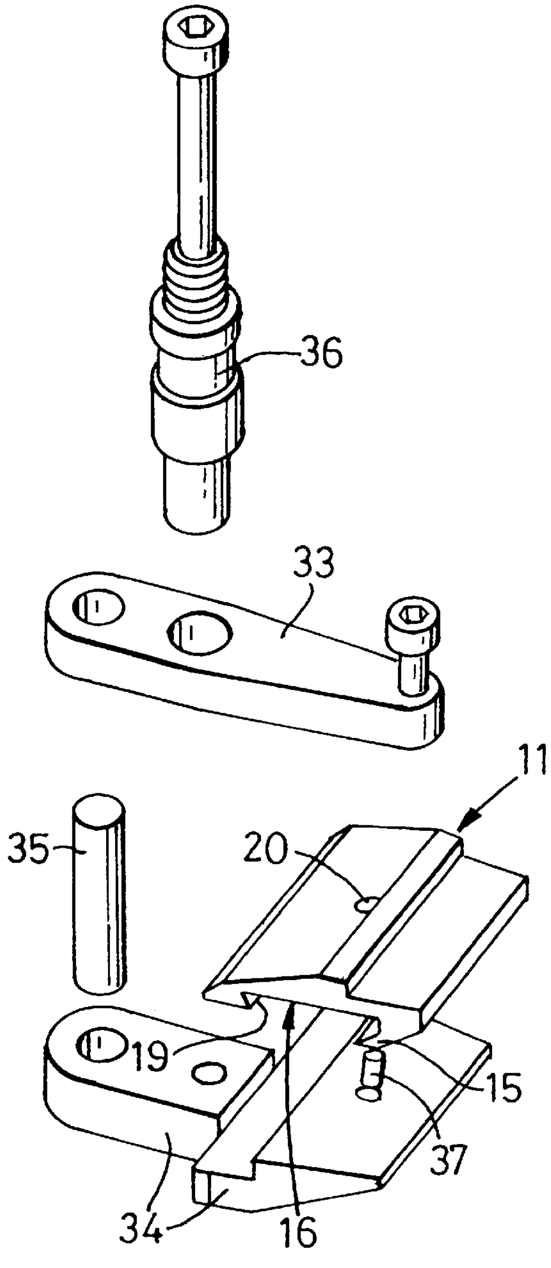
Figure 2:
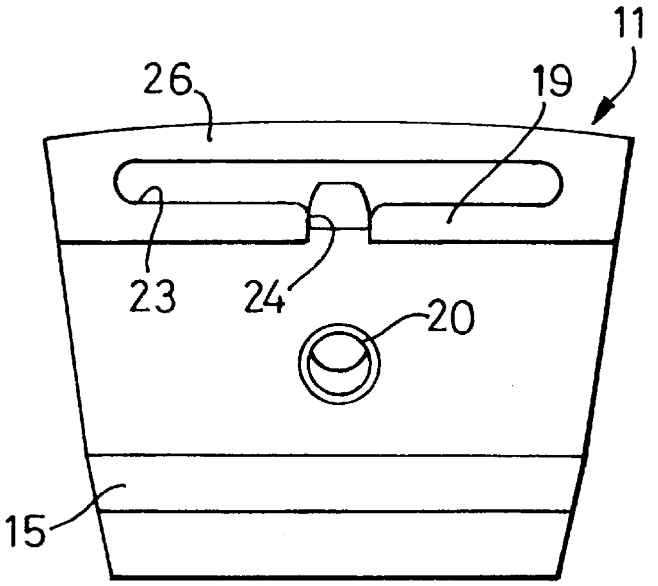
FIGS. 2 and 3 are, respectively, a front elevation and a rear elevation of the tile carrier of FIGS. 1A to 1E.
Figure 3:
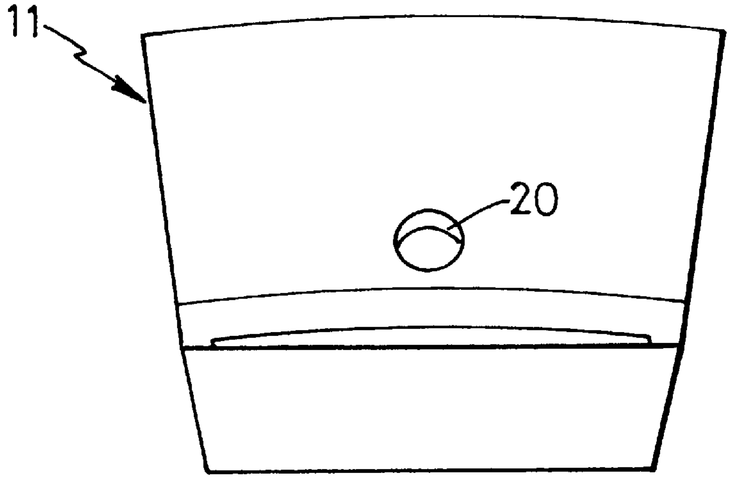
Figure 4:
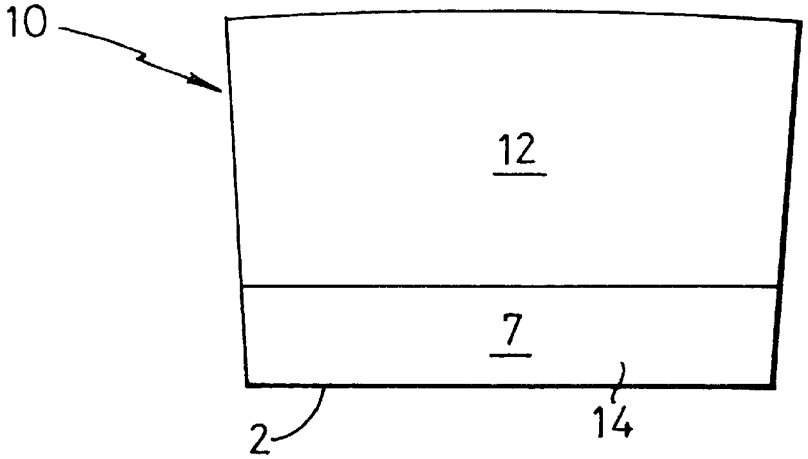
FIGS. 4–6 are, respectively, a front elevation, rear elevation, and plan view of a generally known tile; to be fitted into the carrier of FIGS. 1A to 3.
Figure 5:
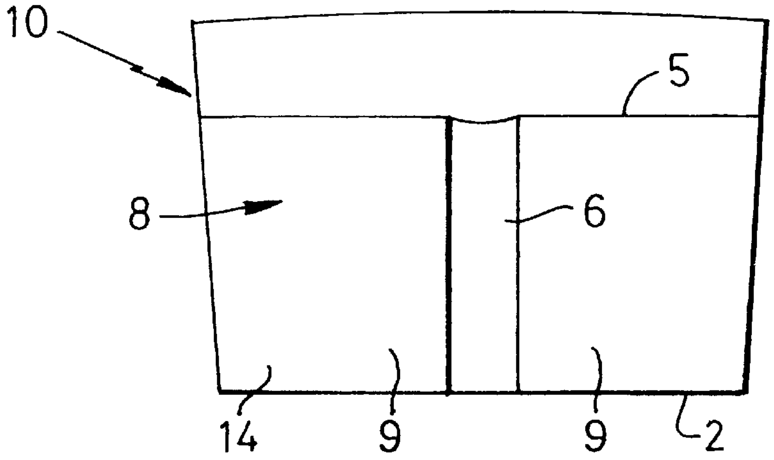
Figure 6:
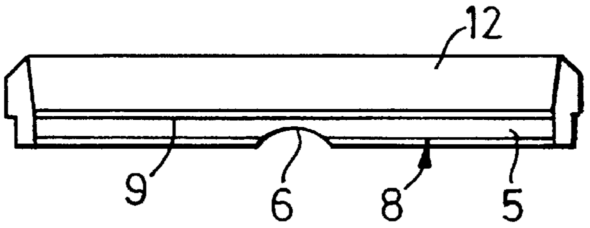

In all Figures, like component parts are allocated like reference numerals.

A tile 10 has a front, working face 12 and a rear, mounting face 9.

The tile 10 may, for example, be of a suitable wear and/or abrasive resistant material such as alumina, a suitable metal, or metallic alloy, or the like.

The lower edge of the rear face 9 of the tile 10, together with a chamfered face 7 at the lower edge of the working face 12, define a lower lip 14 extending the full width of the tile 10, and terminating at a concave surface 2, whilst an upper, parallel surface 5 is located part-way down the rear face 9 and from the surface 5 extends a half dovetail, upper lip 22, the lips 14 and 22 defining the top and bottom of a dovetail rib 8. The otherwise planar rear face 9 is interrupted by a groove 6 extending from the surface 2 to the upper surface 5.

A tile carrier 11, e.g. of stainless steel, includes a dovetail slot or groove 16 defined between mutually facing, upper and lower lips 19 and 15 respectively, adapted, in use, to be engaged by the lips 14 and 22 of a tile 10, the grooves 16 serving for mechanical retention of a tile 10 within its carrier 11. An upper support face 26 of the carrier 11 is provided with a transverse groove 23 stopping short of the ends of the carrier and, via a groove 24, communicating with the transverse dovetail groove 16 of the carrier 11, whilst an aperture 20 extends through the carrier 11.

In accordance with the first aspect of the invention, the carriers 11 are attached to a portion of a flight 31 of a centrifuge (not shown) by mounting each tile carrier 11, prior to a welding step, in the required position on the flight 31 by means of an individual tile clamp 32. Each tile clamp 32 comprises co-operating upper and lower limbs 33, 34, with a guide pin 35 and a screw assembly 36. The lower limb has an index pin 37 adapted to engage the aperture 20 of its carrier 11, thus positioning each carrier 11 in the same position relative to its clamp on each application. The tile clamps 32 are of a set width, so that when mounted side by side (see FIG. 1A and its enlargement) they pitch the carriers 11, so that when the tiles 10 are subsequently inserted there are no gaps between the tiles 10, thus giving a smooth surface without having to incur the further step of dressing the tiles 10. Whilst held in position by the tile clamps, the carriers 11 are welded either singly or in multiple batches to the centrifuge flight 31. The tile clamps 32 are then removed and once the carriers 11 have cooled down to ambient temperature, the tiles 10 may be inserted and secured to their respective tile carriers as described below.

Figure 7:
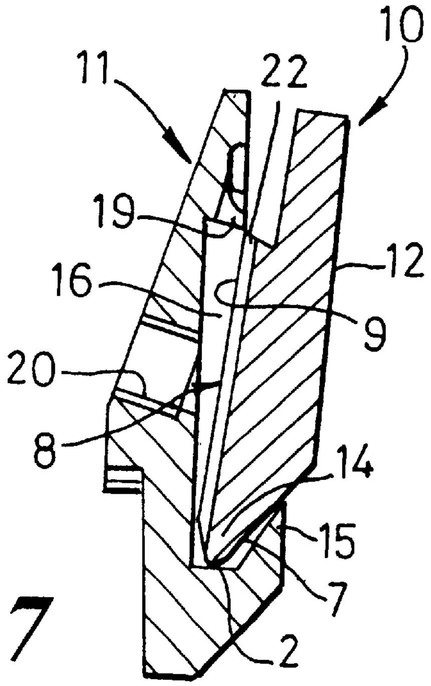
FIGS. 7 and 8 show side elevations of both the tile and the carrier of FIGS. 2–6, showing how the tile is inserted into the carrier in accordance with the second aspect of the invention.
Figure 8:
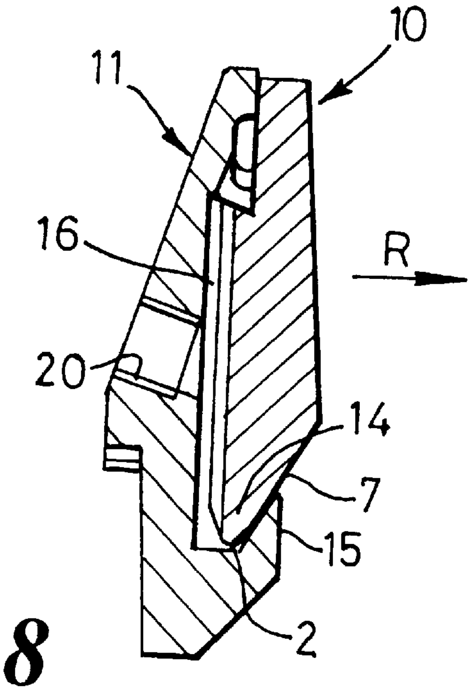

As illustrated in FIGS. 7 and 8, the tile 10 with its dovetail rib 1 is loaded from the front into the tile carrier 11 with its dovetail groove 16. The tolerances of the rib 1 and groove 16 are so arranged that, as illustrated, firstly the lower edge 2 and hence lower lip 14 of the tile 10 is inserted into the lower dovetail groove defined by the lower lip 15 of the carrier 11, secondly the tile 10 is rotated anti-clockwise through a few degrees to bring its upper lip 22 within the upper dovetail groove defined by the upper lip 19 of the carrier 11, and thirdly, the tile is retracted, in the direction of arrow R, so that angled surfaces of the lips 14 and 22 of the tile seat on the angled surfaces of the lips 19 and 15 of the carrier, with retraction being effected, or assisted, by the injection of epoxy resin to the zone 17, through aperture 20 in the carrier 11.

What I claim is:

1. A method of installing tiles via interposed tile carriers on a scroll or flight of a centrifuge comprising i) mounting each tile carrier prior to a welding step in the required position on a centrifuge flight by means of an individual tile clamp, with mechanical inter-engagement between each of said tile carriers and its clamp, thus positioning each said tile carrier in the same position relative to its clamp on each application, said tile clamps being of a set width, so that when mounted side by side said tile clamps pitch said tile carriers so that when said tiles are inserted there are no gaps between said tiles, thus giving a smooth surface without having to dress said tiles;

ii) Welding said tile carriers, whilst held in position by said tile clamps to said centrifuge flight; removing said tile clamps; and iii) once said tile carriers have cooled down to ambient temperature; inserting said tiles and securing said tiles to their respective said tile carriers, wherein said mechanical inter-engagement between each of said tile carriers and its clamp is by an index pin on said clamp which aligns with and engages a hole in said tile carrier.

2. A method of installing tiles via interposed tile carriers on a scroll or flight of a centrifuge comprising i) mounting each tile carrier prior to a welding step in the required position on a centrifuge flight by means of an individual tile clamp, with mechanical inter-engagement between each of said tile carriers and its clamp, thus positioning each said tile carrier in the same position relative to its clamp on each application, said tile clamps being of a set width, so that when mounted side by side said tile clamps pitch said tile carriers so that when said tiles are inserted there are no gaps between said tiles, thus giving a smooth surface without having to dress said tiles;

ii) welding said tile carriers, whilst held in position by said tile clamps to said centrifuge flight; removing said tile clamps; and iii) once said tile carriers have cooled down to ambient temperature; inserting said tiles and securing said tiles to their respective said tile carriers, wherein said securing of the tiles is to their said respective carriers is by an epoxy resin.

3. A method of inserting a tile having a dovetail rib into a carrier having a dovetail groove, comprising:

(i) arranging tolerances of said rib and said groove such that firstly a lower edge of said tile is inserted into a portion of said dovetail groove defined by a lower lip of said carrier, secondly said tile is rotated to bring an upper dovetail rib thereof within said dovetail groove, and thirdly, said tile is retracted so that angled surfaces of dovetail lips of said dovetail rib seat on correspondingly angled surfaces of said dovetail groove, and (ii) securing said tile in position.

4. A method as defined in claim 3, wherein epoxy resin is injected into a zone between said dovetail rib and said dovetail groove to secure said tile in position in said carrier.

5. A centrifuge flight or scroll incorporating a plurality of said tile carriers and said tiles installed in accordance with the method of claim 3.

6. A centrifuge incorporating a flight or scroll, as defined in claim 5.

* * * * *